(12) United States Patent
Wong

(10) Patent No.: US 7,549,645 B1
(45) Date of Patent: Jun. 23, 2009

(54) MULTI-PLAYER AUDIO GAME AND GAME CONSOLE

(76) Inventor: Michael K. Wong, 309 Kaumakani St., Honolulu, HI (US) 96825

( * ) Notice: Subject to any disclaimer, the term of this patent is extended or adjusted under 35 U.S.C. 154(b) by 402 days.

(21) Appl. No.: 11/345,025

(22) Filed: Jan. 31, 2006

Related U.S. Application Data

(60) Provisional application No. 60/650,558, filed on Feb. 7, 2005.

(51) Int. Cl.
*A63F 9/18* (2006.01)
*G06F 15/02* (2006.01)
(52) U.S. Cl. .................... 273/430; 463/35; 273/431
(58) Field of Classification Search ............ 463/35; 273/430, 431
See application file for complete search history.

(56) References Cited

U.S. PATENT DOCUMENTS

| | | | | |
|---|---|---|---|---|
| 5,106,097 A | * | 4/1992 | Levine ................... | 273/237 |
| 5,462,275 A | * | 10/1995 | Lowe et al. ............. | 463/4 |
| 5,695,401 A | * | 12/1997 | Lowe et al. ............. | 463/4 |
| 6,267,379 B1 | * | 7/2001 | Forrest et al. ........... | 273/431 |
| 6,497,412 B1 | * | 12/2002 | Bramm .................. | 273/430 |
| 6,845,408 B1 | * | 1/2005 | Lemke et al. ........... | 710/18 |
| 2003/0008694 A1 | * | 1/2003 | Troy et al. .............. | 463/1 |
| 2003/0071117 A1 | * | 4/2003 | Meade ................... | 235/382.5 |
| 2004/0147301 A1 | * | 7/2004 | Ikeya ..................... | 463/9 |
| 2004/0148419 A1 | * | 7/2004 | Chen et al. ............. | 709/231 |
| 2005/0059492 A1 | * | 3/2005 | Hedin et al. ............ | 463/42 |
| 2005/0170873 A1 | * | 8/2005 | Fishbach et al. ....... | 463/9 |

* cited by examiner

*Primary Examiner*—John M Hotaling, II
*Assistant Examiner*—Masud Ahmed
(74) *Attorney, Agent, or Firm*—Leighton K. Chong

(57) ABSTRACT

A multi-player audio game system and game console enables players to compete against each other based on music that is contained in their own personal music player devices. The game console has multiple ports to allow the players to plug their audio player devices into the game console. In response to pressing a Next button to advance the game, the console displays a music question or challenge selected from questions stored in memory. Upon seeing the challenge displayed, the players compete to be the first to submit a music entry (by playing their entry and pressing the respective Enter button on the console) that meets the challenge from among the songs stored on their audio player devices. The console has an audio signal queuing mechanism to allow the first-in-time player's song input to be played on a speaker while muting the other players' song inputs. If the first-in-time player's entry is deemed incorrect by the other players, the player's Enter button can be pressed a second time to mute that player's song input and allow the next-in-time player's song input to be played, and so on until a winner is found.

20 Claims, 3 Drawing Sheets

MULTI-PLAYER AUDIO GAME AND GAME CONSOLE

This U.S. patent application claims the benefit of the priority filing date of U.S. Provisional Application No. 60/650,558, filed on Feb. 7, 2005.

TECHNICAL FIELD

This invention generally relates to a multi-player audio game and game console for playing the game. In particular, it is directed to a trivia-type game where players can compete with each other by answering musical challenge or trivia questions based on music that they actually listen to and/or is a part of their personal music collection.

BACKGROUND OF INVENTION

Many board games and console games commonly include multimedia components, sounds and/or music to attract and intrigue players of the games. For example, U.S. Pat. No. 6,267,379 to Forrest et al discloses a game host console connected to a plurality of player terminals for playing a multimedia trivia game with scoring for first-in-time and most correct responses. The players' responses are in the form of selections of text and/or images from multiple choices. U.S. Pat. No. 6,102,406 to Miles discloses an Internet-based game host service connected to remote players on computers for playing a scavenger hunt game for information obtained from websites. U.S. Pat. No. 5,916,024 to Von Kohorn shows a game host TV station connected to a plurality of remote game terminals or set-top boxes for playing TV-based broadcast games. The game terminals may be video game machines which can load game programs and score player inputs on keyboard or even voice input. U.S. Pat. No. 5,106,097 to Levine discloses a game host console connected to a plurality of player terminals for playing an audio quiz game based on audio clips played from recorded tracks of a CD. The players' responses are in the form of selections from multiple choices displayed to the players.

Similarly, U.S. Patent Appl. 2005/0059492 of Hedin et al shows a host console connected to a plurality of player devices in which the player devices can access a shared resource (display, input peripheral, etc.) through one of the devices. U.S. Patent Appl. 2004/0148419 of Chen et al shows a multimedia host computer connected to at least one player devices in which the player device is activated to provide an audio input to another player device. U.S. Patent Appl. 2004/0147301 of Ikeya discloses a music-playing host console connected to at least one music-playing device (MIDI keyboard) in which a music piece is activated on the player device by the host and the MIDI inputs from the player's playing of the piece is recorded and scored by the host console.

While previous devices have generally used various arrangements of game host console connected to multiple player units for playing various music trivia or music-playing games, none of them allow a music challenge or trivia game to be played by enabling players to compete against each other based on music that they actually listen to and/or is a part of their personal music collection.

SUMMARY OF INVENTION

In accordance with the present invention, a multi-player audio game and game console enables players to compete against each other based on music that is contained in their own personal music player devices. Device such as iPod™ (sold by Apple Computer Corp.) or other MP3 digital audio players, music CD players, or other types of audio player units are becoming ubiquitous personal devices that often contain hundreds if not thousands of songs that users listen to. The invention enables multiple players to play a music challenge or trivia game by being the first to enter a correct entry from the music stored on their personal music player devices.

The game console has multiple player ports to allow a number of players to plug their audio player devices into the game console. When a "Start" or "Next" button is pushed, the console displays a music question or challenge such as "Be The First to Play A Song From Motown". The music challenge may be selected randomly from a number of challenges stored in a memory for the console display. Upon seeing the challenge displayed, the players will compete to be the first to submit an audio entry that meets the challenge from among the songs stored on their audio player devices. Each player is expected to find a suitable song on their device and begin playback to send an audio signal (in analog or digital format) to the game console. The console has a signal queuing mechanism that allows the fastest (first-in-time) player's song input to be played on a speaker while muting the other players' (later-in-time) song inputs. The mechanism operates to queue the players' song inputs according to the timing of their input. If the fastest player's entry is deemed incorrect by the other players, then he/she/they will push a "Mute" or "Cancel" switch to mute the first song input and allow the next-in-time player's song input to be played, and so on until a winner is found.

Depending on the type of console desired, the signal queuing mechanism may be operable in manual, circuit-controlled, or MPU-controlled manner. In a manual system for handling analog audio inputs, the players press a "Enter" button on the game console at their positions in order to transmit their song input from their audio players to the console. The first button to be depressed allows the first song input to be played through to the speaker, while the other song inputs are muted but queued in order. In a circuit-controlled system, an IC circuitry detects the input audio signals on the incoming lines and performs the playback-queuing function electronically. In an MPU-driven system, the song inputs may be in audio or digital signal format and the playback-queuing function is carried out under MPU control.

Other objects, features, and advantages of the present invention will be explained in the following detailed description of the invention having reference to the appended drawings.

DETAILED DESCRIPTION OF INVENTION

Figure 1:
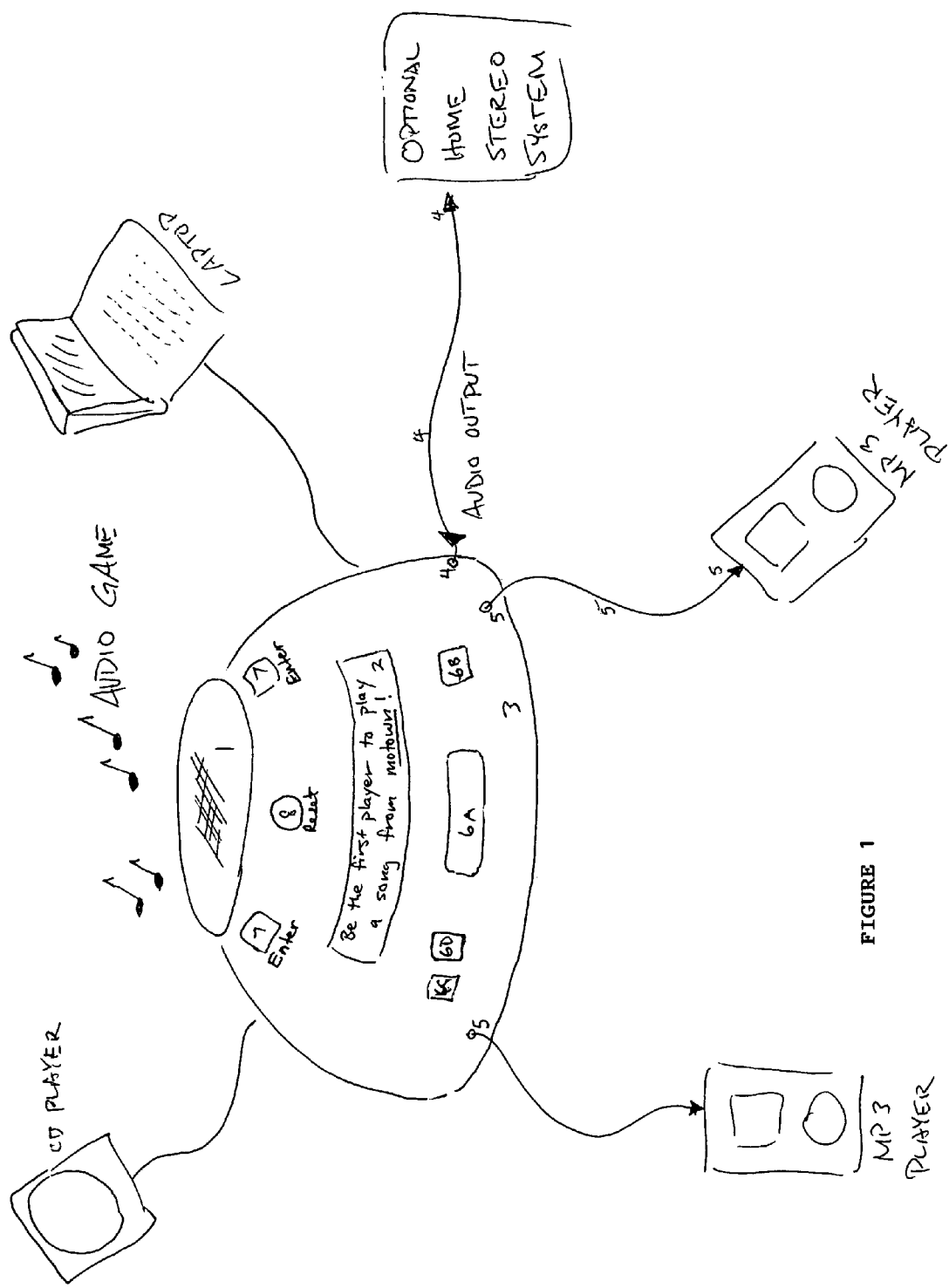
FIG. 1 is a schematic diagram of an audio game system and game console in accordance with the present invention.

In the following detailed description, certain preferred embodiments are described as implemented in a specific type of computerized environment with specific details set forth in order to provide a thorough understanding of the present invention. However, it will be recognized by one skilled in the art that the present invention may be practiced without these specific details or with equivalents thereof. In other instances, well known methods, procedures, components, functions have not been described in detail as not to unnecessarily obscure aspects of the present invention.

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "translating" or "calculating" or "determining" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Aspects of the present invention, described below, are discussed in terms of steps executed on a computer system. In general, any type of general purpose, programmable computer system can be used by the present invention. A typical computer system has input and output data connection ports, an address/data bus for transferring data among components, a central processor coupled to the bus for processing program instructions and data, a random access memory for temporarily storing information and instructions for the central processor, a large-scale permanent data storage device such as a magnetic or optical disk drive, a display device for displaying information to the computer user, and one or more input devices such as a keyboard including alphanumeric and function keys for entering information and command selections to the central processor, and one or more peripheral devices such as a mouse. Such general purpose computer systems and their programming with software to perform desired computerized functions are well understood to those skilled in the art, and are not described in further detail herein.

Referring to FIG. 1, an audio game system and game console in accordance with the invention has a speaker 1 for playing back output audio signals as sound, a display 2 (such as an LCD) on one or more sides of a console body 3 for displaying music challenge or trivia questions and other game instructions, an audio output jack, wire, or plug 4 for sending output audio optionally to an external sound system, a number (here 4) of audio input jacks, wires, or plugs 5 and upwardly positioned "Enter" buttons 7 for enabling the players to input audio signals (digital or analog) for music selections from their respective audio player devices, game/display control buttons 6. If a player's entry is an incorrect response to a game challenge or trivia question, pressing the "Enter" button a second time is used to mute the player's incorrect music selection. A "Reset" button 8 is used to cancel a current game or start a new game.

Figure 2:
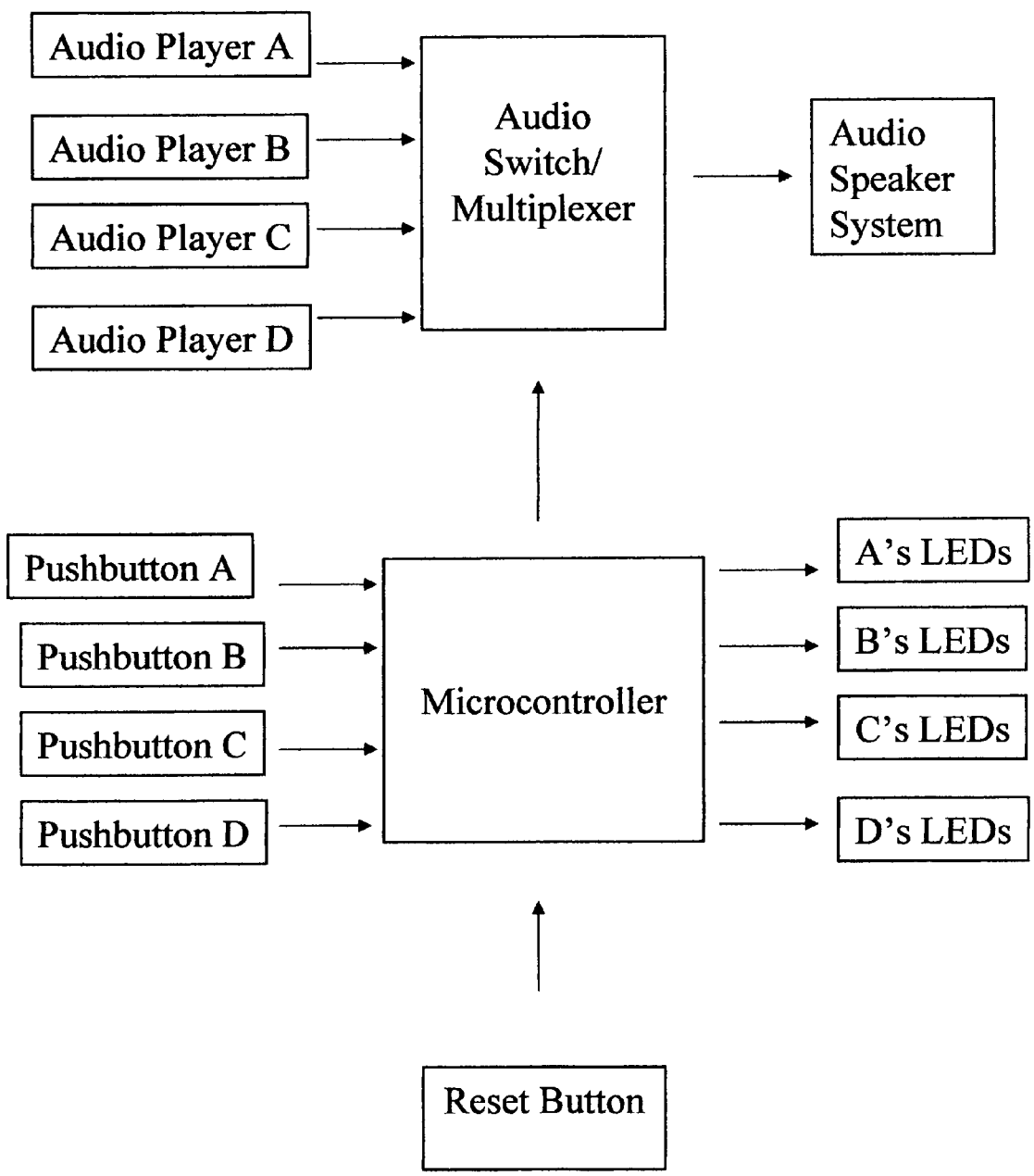
FIG. 2 is a block diagram of a preferred embodiment audio signal queuing circuit for the game console.

Referring to FIG. 2, a block diagram shows a preferred embodiment for the game console provided with a manual audio signal queuing circuit. The Audio Players A, B, C, D are plugged into the game console and connected to an Audio Switch/Multiplexer which latches the incoming audio signals. When the players press their "Enter" Pushbuttons A, B, C, D for inputting music selections from their respective Audio Player devices, a Microcontroller receives the Enter signals and sends a switch signal to the Multiplexer to release the first-in-time audio signal to the Audio Speaker System. If the first-in-time entry is rejected by the other players determining that it is an incorrect entry and press the player's "Entry" Pushbutton again, the first-in-time entry is muted and the next-in-time entry is released to the Audio Speaker System.

Figure 3:
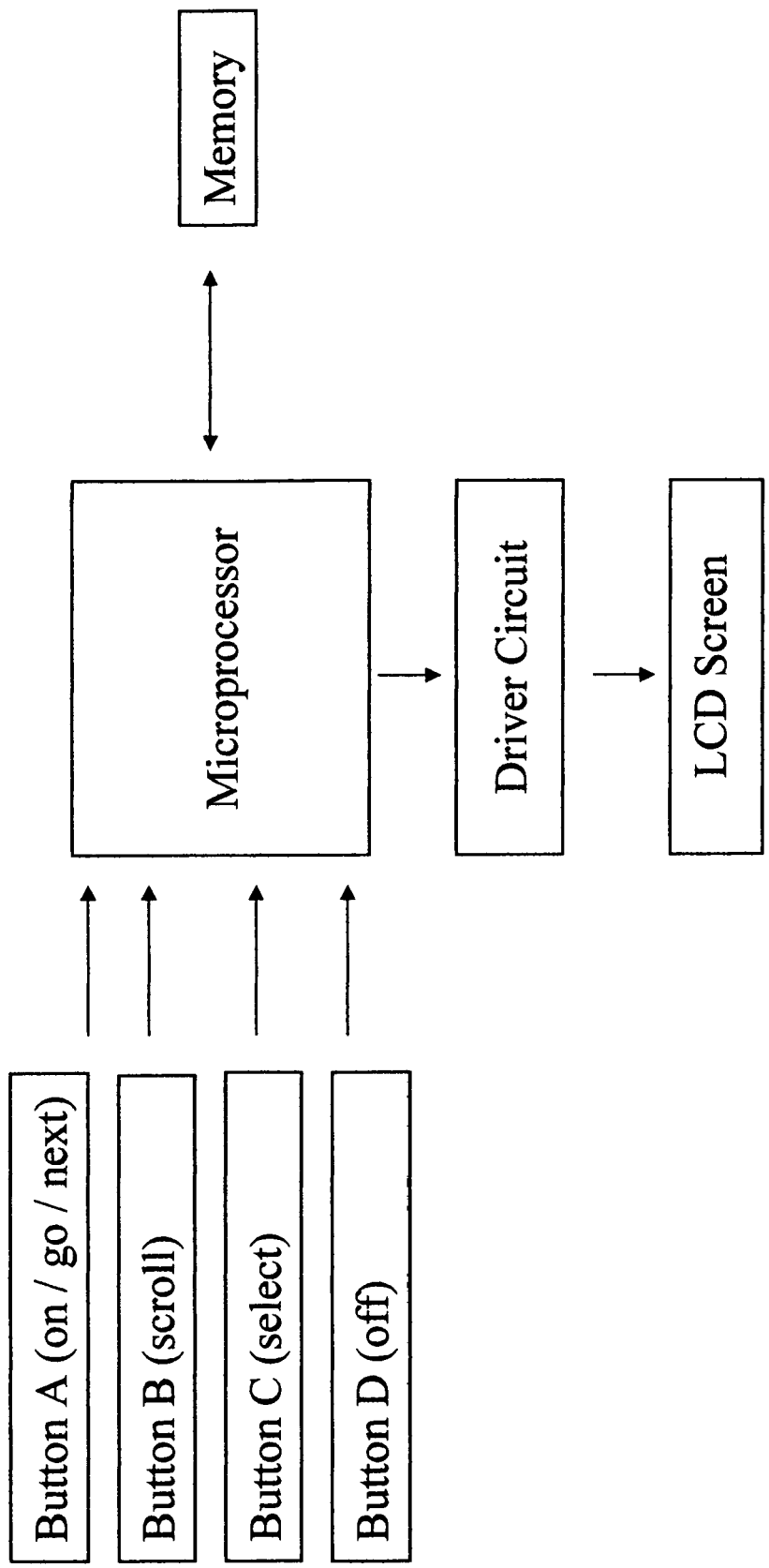
FIG. 3 is a block diagram of a game display control circuit for the game console.

Referring to FIG. 3, a block diagram illustrates display circuitry for the game console 3 having a Microprocessor and associated Memory for storing game questions and instructions and displaying them via a Driver Circuit on one or more LCD Screen(s) visible on the outside of the console. Inputs from buttons 6 to the Microprocessor include an on/go/next signal, a scroll signal, a select signal, and an off signal.

The audio game system challenges the participant(s) ability to find then play a selection from their audio player in the quickest time and/or with the most appropriate selection, given the specific game question. Upon pressing the "Start Game" or "Next Question" cue button 6, the participants are presented with a specific question or challenge for an audio selection on the display 2. The participants will use their audio player to find and play audio signals for an appropriate audio selection in response to the given criteria. The timeliness (first in time) and/or correctness of the audio selection will determine who has won the point(s) for that round. The signal queuing switch in the console's audio circuit will playback the audio selection that is first-in-time to the audio speaker, while simultaneously muting the input audio signals of the other participants. If the played entry is incorrect, the other participants can challenge the participant entering the played music, cut off his/her selection, and the console circuitry will then play the next-in-time entry. Upon playing and listening to the selection, the appropriateness of the selection is determined (by the participants) in relation to the criteria, and a score is given accordingly. Scoring and players scores are done manually.

Audio Game Play

Inherent in the Audio Game System are many variations of game play according to selected criteria and topics. Prior to starting, the participants will be able to choose which game they want to play by cycling through the "Scroll" button 6. They may want to choose to play a single and particular topic, a specified number of topics, or all the different topics. For example, the game topic may be "Word" and an example of a challenge may be "Be the first to play song that contains the word happy in it's title/lyrics", or the game topic may be "Message" and an example of a challenge may be "Be the first to play a song about sports", or the game topic may be "Greatest of all time" and an example of a challenge may be "Everyone play the greatest love song of all time", etc. Points awarded to the player who meets the various criteria may vary according to the different topics. The following are some types of criteria or topics and some examples of challenges within each topic that can be used for these audio games:

Word—Be the first to play a song with the word _____ in its title.
    e.g., happy, dance, dream, . . .

Genre—Be the first to play a song in the _____ genre.
    e.g., hip hop, folk, funk, acapella, Artist—Be the first to play a song by _____.
    e.g., Bob Marley, a deceased artist, a lesbian artist, . . . .

Language—Be the first to play a song which contains _____.
    e.g., French, Spanish, African, . . .

Emotion—Be the first to play a _____ song.
    e.g., love, sad, angry, optimistic Message—Be the first to play a song that sings about _____.
    e.g., war, politicians, sports, food Media—Be the first to play a song from a _____.
    e.g., TV show, movie soundtrack, Broadway Instrument—Be the first to play a song with _____ as its primary instrument.
    e.g., guitar, piano, drums, . . .

Time—Be the first to play a song _____.
    e.g., 60's, Motown, Christmas, high school Music Theory—Be the first to play a song _____.
    e.g., 4/4 time, that has a bridge, w/4 part harmony, . . .

The following categories are not won with speed, the challenge may be more subjective. An example may be that participants will be instructed to vote on the most fitting selection with the exception that they cannot vote on their own. Each vote for a particular selection earns the participant a point.

The Greatest of All Time!—Everyone play what you think is the best _____ song.
    e.g., love, dance, influential, psyche up, sad Karaoke Time!—You must be able to sing all of the words to a _____ song.
    e.g., rap, reggae, Trivia—Everyone play what you think is the _____ song.
    e.g., earliest rap song, latest heavy metal, . . .

Another variation is how the topics/criteria are presented. The criteria can either be flashed upon a display on the console or they can be written on cards for the participants to choose and read. If the criteria are on cards, there can be different sets of cards based on topic, with each card having one question or set of criteria. Or there can be one of every topic per card, with a mode of choosing the topic prior to flipping and reading the card. Participants could take turns choosing the topic or there could be a die rolled correlating to a particular topic.

Game Console Construction

The Audio Game console can have many possible variations of construction. Having a microprocessor-driven LCD display on the console is probably the best and most engaging construction for game play. Participants will be able to see choices for games or topics they would like to play. Upon a participant pressing the On switch (6 in FIG. 1), the microprocessor can access the list of game playing options from an associated memory sends them to the driver circuit for the console's LCD display. Participants can use the "Scroll" button to scroll or move the display through the different options, and use the "Select" button to choose from the various topic.

The "Go" or "Next" button is used to start the game after all selections are made and/or during play to go to the next challenge.

With each music criteria or topic, participants will use their audio player units to input an appropriate audio selection in response to the given criteria. The timeliness and/or appropriateness of the audio selection will determine who has won the point(s) for that round. With the playback of the first- or next-in-time audio selection, the LED lights will show the player position playing, and the other players can then judge whether the audio selection matches the given criteria.

Due to the different types of audio players that can be used (analog or digital), different ways to connect from the audio players to a console, and different types of audio switch mechanisms, there can be other variations for configuring the Audio Game console. Three different types of audio controller systems can be built. As described above, the most easily and inexpensively implemented is a manually operated system in which participants press designated "Enter" buttons on the console for their inputs, and a microcontroller then accepts the inputs in order in which audio entries will be played. A more advanced system would be one with an automatic controller system, in which an audio detection circuit detects the input audio from the different sources and determines their times-of-arrival as the order in which the audio entries will be played. The most advanced system will be totally MPU or CPU driven, in which all console functions are carried out under software programmed control.

The following table summarizes some possible combinations for construction of the Audio Game console:

| | Player | Signal | Connectivity (player to console) | Controller |
|---|---|---|---|---|
| 1 | Analog/Digital | Analog | Audio cables with ⅛" stereo plug | Manual |
| 2 | Analog/Digital | Analog | Audio cables with ⅛" stereo plug | Auto Circuit |
| 3 | Digital | Digital | USB 1.1 & 2.0 | MPU/CPU Driven |
| 4 | Digital | Digital | IEEE 1394/Firewire | MPU/CPU Driven |
| 5 | Digital | Digital | Proprietary | MPU/CPU Driven |
| 6 | Digital | Digital | Other | MPU/CPU Driven |
| 7 | Digital | Analog/RF | Wireless via Radio Frequency | Manual |
| 8 | Digital | Analog/RF | Wireless via Radio Frequency | Auto Circuit |

Instead of having multiple types of ports and audio circuits in one game console, different game console constructions can be packaged as different hardware types of game packages, e.g., "For Computers" or "For MP3 Players". Since the participants are providing their own audio players, the largest market initially will be for ⅛" stereo plugs that can connect to popular MP3 and audio player units.

The game may also be configured to receive player inputs online so that the participants may play from remote locations through an online connection to a computer.

It is understood that many modifications and variations may be devised given the above description of the principles of the invention. It is intended that all such modifications and variations be considered as within the spirit and scope of this invention, as defined in the following claims.

The invention claimed is:

1. An audio game system comprising:
an audio game console adapted to be connected to a plurality of audio playback devices for respective participants in a music selection game wherein each audio playback device stores a plurality of music files representing the participant's own chosen music inventory, and has an audio signal output for transmitting to the game console an audio signal for any music file selected by the participant in response to a game question or challenge of a game played on said game console, so that each participant can select a music selection stored on their respective audio playback device they deem suitable in response to the game question or challenge and play an output of audio signals from their audio playback device as their respective music selection in response to the game question or challenge;
said audio game console having a console body and a plurality of inlets arranged on said console body for the respective game participants for enabling them to connect their respective audio playback devices to enter their audio signal outputs for their respective music selections in response to the game question or challenge;
an audio signal queuing mechanism provided with said game console for determining an ordering by time-of-entry among the audio signal outputs from the participants' audio playback devices for the respective music selections of the respective game participants input into said game console inlets and for transmitting to a speaker circuit one or more of the audio signal outputs from the participants' audio playback devices based on the determined queuing order; and
a speaker circuit provided with said game console for playing an audio sound output from the audio signal output for at least a music selection received first-in-time from a participant's audio playback device and transmitted through the audio signal queuing mechanism.

2. An audio game system according to claim 1, wherein the audio signal queuing mechanism includes a plurality of "Enter" buttons corresponding to the inlets which are pressed by the participants to enable entry of the audio signal outputs for their respective music selections.

3. An audio game system according to claim 1, wherein the audio signal queuing mechanism includes a circuit device for detecting the times-of-arrival for the entries of the audio signal outputs input by the participants for their respective music selections and for ordering said entries in order based on their times-of-arrival.

4. An audio game system according to claim 3, wherein the circuit device is a microprocessor which detects the times-of-arrival for the entries of the audio signal outputs input by the participants for their respective music selections.

5. An audio game system according to claim 1, having a display on one or more sides of the console body for displaying music challenge or trivia questions and other game instructions, and a microprocessor with an associated memory for controlling said display.

6. An audio game system according to claim 1, having buttons arranged at the respective positions for the game participants to enable cutting off or muting of a participant's music selection to play the music selection of the next participant in the determined queue.

7. An audio game system according to claim 2, wherein any of said "Enter" buttons when pushed a second time causes the respective input of the participant's music selection to be cut off or muted.

8. An audio game system according to claim 7, wherein the audio signal queuing mechanism includes a circuit device for detecting the times-of-arrival for the entries of the audio signal outputs input by the participants for their respective music selections and for ordering said entries in order of their times-of-arrival, and wherein, after an entry is played, the "Enter" button for that entry may be pushed by any participant to cut off playing that entry, and the circuit device then causes the next queued entry to be transmitted to the speaker circuit and played.

9. An audio game console adapted to be used with a plurality of audio playback devices connected thereto, wherein each audio playback device stores a plurality of music files representing the participant's own chosen music inventory, and has an audio signal output for transmitting to the game console an audio signal for any music file selected by the participant for playback on the game console in response to a game question or challenge of a game played on said game console, comprising:
a console body having a plurality of inlets for enabling a plurality of game participants respectively to connect the audio signal outputs for their respective audio playback devices to enter audio signals for their respective music selections in response to a game question or challenge requiring a music selection from each player's playback device as each player's input of a respective answer to the game question or challenge;
an audio signal queuing mechanism provided in said console body for receiving the audio signal outputs from the audio playback devices of the respective game participants and for determining an ordering by time-of-entry among the audio signals for their respective music selections of the respective game participants input into said inlets and for transmitting to a speaker circuit one or more of the audio signal outputs based on the determined queuing order; and
a speaker circuit provided in said console body for playing an audio sound output of the audio signal for at least a music selection received first-in-time from a player's audio playback device through the audio signal queuing mechanism.

10. An audio game console according to claim 9, wherein the audio signal queuing mechanism includes a plurality of "Enter" buttons corresponding to the inlets which are pressed by the participants to enable entry of the audio signal outputs for their respective music selections.

11. An audio game console according to claim 9, wherein the audio signal queuing mechanism includes a circuit device for detecting the times-of-arrival for the entries of the audio signal outputs input by the participants for their respective music selections and for ordering said entries in order based on their times-of-arrival.

12. An audio game console according to claim 11, wherein the circuit device is a microprocessor which detects the times-of-arrival for the entries of the audio signal outputs input by the participants for their respective music selections.

13. An audio game console according to claim 9, having a display on one or more sides of the console body for displaying music challenge or trivia questions and other game instructions, and a microprocessor with an associated memory for controlling said display.

14. An audio game console according to claim 9, having buttons arranged at the respective positions for the game participants to enable cutting off or muting of a participant's music selection to play the music selection of the next participant in the determined queue.

15. An audio game console according to claim 10, wherein any of said "Enter" buttons when pushed a second time causes the respective input of the participant's music selection to be cut off or muted.

16. An audio game console according to claim 15, wherein the audio signal queuing mechanism includes a circuit device for detecting the times-of-arrival for the entries of the audio signal outputs input by the participants for their respective music selections and for ordering said entries in order of their times-of-arrival, and wherein, after an entry is played, the "Enter" button for that entry may be pushed by any participant to cut off playing that entry, and the circuit device then causes the next queued entry to be transmitted to the speaker circuit and played.

17. A method of playing an audio game on a game console with a plurality of game participants having respective audio playback devices wherein each audio playback device stores a plurality of music files representing participant's own chosen music inventory, and has an audio signal output for transmitting an audio signal to the game console for any music file selected by the participant for playback in response to a game question or challenge of a game played on the game console, comprising:

presenting for a plurality of game participants a game question or challenge requiring a music selection from each player's audio playback device as each player's input of a respective answer to the game question or challenge;

transmitting audio signals from the audio playback devices of the respective game participants and receiving through a plurality of inlets arranged on the game console the audio signals from the respective audio playback devices selected by the game participants as their respective music selections in response to the game question or challenge;

determining at least a first-in-time entry from among the audio signals for the music selections of the respective game participants input to the game console; and playing an audio sound output on a speaker circuit coupled to the inlets to the game console of the audio signal for at least the music selection received first-in-time from a player's audio playback device.

18. A method of playing an audio game on a game console according to claim 17, further comprising enabling the game participants to cut off or mute an entry being played on the game console if it is deemed incorrect by any of the game participants.

19. A method of playing an audio game on a game console according to claim 17, further comprising enabling game questions and instructions to be stored in a memory in the game console and displayed on a display to the game participants.

20. A method of playing an audio game on a game console according to claim 18, further comprising determining an ordering based on times of entry of each of the inputs to the console by the participants, and playing an audio sound output on the game console for a next-in-time entry in the determined ordering if an earlier-in-time entry is cut off by any of the participants.

* * * * *